US010739510B2

(12) United States Patent
Lerman

(10) Patent No.: US 10,739,510 B2
(45) Date of Patent: Aug. 11, 2020

(54) SOLID-STATE LUMINAIRE

(71) Applicant: Quarkstar LLC, Las Vegas, NV (US)

(72) Inventor: Louis Lerman, Las Vegas, NV (US)

(73) Assignee: Quarkstar LLC, Las Vegas, NV (US)

(*) Notice: Subject to any disclaimer, the term of this patent is extended or adjusted under 35 U.S.C. 154(b) by 0 days.

(21) Appl. No.: 16/228,388

(22) Filed: Dec. 20, 2018

(65) Prior Publication Data

US 2019/0383986 A1 Dec. 19, 2019

Related U.S. Application Data

(63) Continuation of application No. 14/767,564, filed as application No. PCT/US2014/015707 on Feb. 11, 2014, now Pat. No. 10,162,098.

(Continued)

(51) Int. Cl.
*F21V 8/00* (2006.01)
*F21V 7/00* (2006.01)
(Continued)

(52) U.S. Cl.
CPC .......... *G02B 6/0051* (2013.01); *F21V 7/0016* (2013.01); *F21V 7/04* (2013.01);
(Continued)

(58) Field of Classification Search
CPC .. G02B 6/0051; G02B 6/0063; G02B 6/0073; F21V 7/04; F21V 7/0016; F21V 7/05; F21V 13/02
(Continued)

(56) References Cited

U.S. PATENT DOCUMENTS 5,709,463 A * 1/1998 Igram ................... F21V 5/002
349/161
6,280,052 B1 * 8/2001 White ..................... F21S 2/00
362/223

(Continued)

FOREIGN PATENT DOCUMENTS

EP 1953451 8/2008
FR 2934353 1/2010
(Continued)

OTHER PUBLICATIONS

European Application No. 18182177.8, Extended European Search Report, dated Feb. 11, 2019, 9 pages.
(Continued)

*Primary Examiner* — Bryon T Gyllstrom
(74) *Attorney, Agent, or Firm* — Fish & Richardson P.C.

(57) ABSTRACT

A luminaire includes (i) light-emitting elements (LEEs), (ii) couplers to receive light from the LEEs and to redirect the received light, and (iii) a light guide including input and output ends and a pair of opposing surfaces both extending along an axis of the light guide. The light guide receives light from the couplers at the input end and guides light along the axis to the output end. The luminaire includes (iv) a diffuser adjacent the light guide to diffuse at least a portion of the light output by the light guide, and (v) a reflector to receive the light emitted from the output end of the light guide, such that light output by the light guide without impinging on the diffuser impinges on only one of the surfaces of the reflector. When operated, the luminaire outputs light within first and second output angular ranges.

16 Claims, 13 Drawing Sheets

Related U.S. Application Data

(60) Provisional application No. 61/764,524, filed on Feb. 13, 2013.

(51) Int. Cl.
| | | |
|---|---|---|
| *F21V 7/05* | (2006.01) | |
| *F21V 13/02* | (2006.01) | |
| *F21V 7/04* | (2006.01) | |
| *F21Y 115/30* | (2016.01) | |
| *F21Y 115/10* | (2016.01) | |

(52) U.S. Cl.
CPC .............. *F21V 7/05* (2013.01); *F21V 13/02* (2013.01); *G02B 6/0063* (2013.01); *G02B 6/0073* (2013.01); *F21Y 2115/10* (2016.08); *F21Y 2115/30* (2016.08); *G02B 6/0011* (2013.01)

(58) Field of Classification Search
USPC .......................................................... 362/606
See application file for complete search history.

(56) References Cited

U.S. PATENT DOCUMENTS

| | | | | |
|---|---|---|---|---|
| 6,283,618 B1* | 9/2001 | Fischer | ...................... | F21S 8/06 |
| | | | | 362/319 |
| 7,290,906 B2* | 11/2007 | Suzuki | ................. | B60Q 1/2696 |
| | | | | 362/511 |
| 7,341,358 B2* | 3/2008 | Hsieh | .................... | F21V 7/0091 |
| | | | | 362/97.1 |
| 8,075,147 B2* | 12/2011 | Chaves | ..................... | F21K 9/61 |
| | | | | 362/235 |
| 8,231,256 B1 | 7/2012 | Coleman et al. | | |
| 2006/0193137 A1* | 8/2006 | Chinniah | ............... | F21V 7/0091 |
| | | | | 362/326 |
| 2011/0175533 A1* | 7/2011 | Holman | ..................... | E04B 9/32 |
| | | | | 315/130 |
| 2011/0273900 A1* | 11/2011 | Li | ....................... | G02B 19/0019 |
| | | | | 362/555 |
| 2012/0069595 A1* | 3/2012 | Catalano | ............... | F21V 17/002 |
| | | | | 362/555 |
| 2012/0268966 A1* | 10/2012 | McCollum | ................ | F21S 8/06 |
| | | | | 362/607 |
| 2012/0287633 A1 | 11/2012 | Kelly et al. | | |
| 2013/0208495 A1* | 8/2013 | Dau | ...................... | F21V 7/0008 |
| | | | | 362/551 |
| 2015/0055369 A1* | 2/2015 | Tarsa | .................... | G02B 6/0078 |
| | | | | 362/609 |

FOREIGN PATENT DOCUMENTS

| | | |
|---|---|---|
| WO | WO2005073629 | 8/2005 |
| WO | WO2012176352 | 12/2012 |

OTHER PUBLICATIONS

International Application No. PCT/US14/15707, Notification of Transmittal of the International Search Report and the Written Opinion of the International Searching Authority, dated May 29, 2014, 11 pages.

European Application No. 14750974.9, Communication pursuant to Rule 164(1) EPC, dated Nov. 14, 2016, including Supplementary Partial European Search Report, 8 pages.

European Application No. 14750974.9, Communication dated Feb. 21, 2017, including European Search Report, 6 pages.

* cited by examiner

SOLID-STATE LUMINAIRE

CROSS-REFERENCE TO RELATED APPLICATIONS

This application is a continuation application and claims priority to U.S. application Ser. No. 14/767,564, filed Aug. 12, 2015, which is a U.S. National Stage of International Application No. PCT/US2014/015707, filed Feb. 11, 2014, which claims benefit under 35 U.S.C. § 119(e)(1) of U.S. Provisional Application No. 61/764,524, filed on Feb. 13, 2013, which is incorporated by reference herein.

FIELD OF THE TECHNOLOGY

The present technology relates to solid-state luminaires.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present technology relates to solid-state luminaires. According to a first aspect of the present technology, a luminaire includes (a) one or more light-emitting elements (LEEs) arranged to provide light within a first angular range; (b) one or more couplers arranged to receive light from the one or more LEEs and configured to provide light within a second angular range; (c) a light guide including an input end and an output end at opposing ends of the light guide and a pair of opposing surfaces both extending along an axis of the light guide, the light guide being arranged to receive light from the one or more couplers at an input end and guide light along the axis to the output end of the light guide; (d) a diffuser adjacent the light guide and configured to diffuse at least a portion of the light output by the light guide; and (e) a reflector having two or more surfaces, the reflector being positioned to receive the light emitted from the output end of the light guide, such that light output by the light guide without impinging on the diffuser impinges on only one of the surfaces of the reflector. When operated, the luminaire outputs light within a first output angular range and a second output angular range.

Implementations of the first aspect may include one or more of the following features. In some implementations, the diffuser is a transmitting diffuser at the output end of the light guide. Here, the reflector is spaced apart from the diffuser and oriented to receive diffusely transmitted light from the diffuser and is configured to redirect the diffusely transmitted light in the first and second output angular ranges. In other implementations, the diffuser is a transmitting diffuser at a side surface of the light guide adjacent the output end and is configured to provide diffusely transmitted light in the first output angular range. Here, the reflector is spaced apart from the diffuser and oriented to receive light from the output end of the light guide and is configured to redirect the received light in the second output angular range. In some other implementations, the luminaire also can include a second diffuser adjacent the light guide and configured to diffusely transmit at least another portion of the light guided by the light guide. Here, the diffuser and the second diffuser are at different side surfaces of the light guide adjacent the output end and are configured to respectively diffusely transmit light in the first and second output angular ranges. Additionally, the reflector is coupled to the light guide at the output end and is configured to reflect light—guided by the light guide—towards the diffuser and the second diffuser. In the latter implementations, the light in one of the first or second output angular ranges propagates forward and the light in the other output angular range propagates backward.

In some implementations, the one or more couplers substantially propagate light within a solid transparent material. In some implementations, the light guide substantially propagates light within a solid transparent material. In some implementations, the light guide is a planar light guide. In some implementations, the reflector has an elongate configuration. In some implementations, the at least one of the surfaces of the reflector is convex. In some implementations, the at least one of the surfaces of the reflector is concave. In some implementations, the diffuser extends across a portion of the width of the light guide proximate the output end. When applicable, the second diffuser extends across a second portion of the width of the light guide proximate the output end.

According to a second aspect of the present technology, a luminaire includes (a) one or more light-emitting elements (LEEs) arranged to provide light within a first angular range; (b) one or more couplers arranged to receive light from the one or more LEEs and configured to provide light within a second angular range; (c) a light guide including an input end and an output end at opposing ends of the light guide and a pair of opposing surfaces both extending along an axis of the light guide, the light guide being arranged to receive light from the one or more couplers at the input end and guide light along the axis to the output end of the light guide and output light from the output end in a first output angular range; (d) a first diffuser at a first of the opposing surfaces of the light guide adjacent the output end and configured to diffusely transmit light in a second output angular range; and (e) a second diffuser at a second of the opposing surfaces of the light guide adjacent the output end and configured to diffusely transmit light in a third output angular range.

Implementations of the second aspect may include one or more of the following features. In some implementations, the light in the first output angular range propagates forward and the light in at least one of the second or third output angular ranges propagates backward.

In some implementations, the one or more couplers substantially propagate light within a solid transparent material. In some implementations, the light guide substantially propagates light within a solid transparent material. In some implementations, at least one of the first or second diffuser extends across a portion of the width of the light guide proximate the output end.

According to a third aspect of the present technology, a luminaire includes (a) one or more light-emitting elements (LEEs) arranged to provide light within a first angular range; (b) one or more couplers arranged to receive light from the one or more LEEs and configured to provide light within a second angular range; (c) a light guide including an input end and an output end at opposing ends of the light guide, the light guide being arranged to receive light from the one or more couplers at the input end and guide light along an axis to the output end of the light guide; and (d) a reflector having a first surface and a second surface opposite the first surface, the reflector being positioned to receive the light emitted from the output end of the light guide, first and second surfaces being arranged asymmetrically with respect to the axis so that, during operation, the first surface of the reflector reflects light from the light guide in a first output angular range and the second surface of the reflector reflects light from the light guide in a second output angular range. The first and second output angular ranges are asymmetric relative to each other with respect to the axis, and light in at least one of the first and second output ranges propagates forward with respect to the axis.

Implementations of the third aspect may include one or more of the following features. In some implementations, the first and second surfaces of the reflector extend parallel to a common plane that is non-parallel to the axis. In some implementations, an edge of the reflector is arranged proximate to the output end of the light guide. In some implementations, the light guide is a planar light guide. In some implementations, the light guide substantially propagates light within a solid transparent material.

According to a fourth aspect of the present technology, a luminaire includes (a) one or more light-emitting elements (LEEs) arranged to provide light within a first angular range; (b) one or more couplers arranged to receive the light provided by the one or more LEEs and configured to provide light within a second angular range; (c) a diffuser in a path of only a portion of the light provided by the one or more couplers and configured to diffusely transmit at least some of the portion of the light; and (d) a reflector having a first surface and a second surface opposite the first surface, the reflector being arranged so that the first surface receives at least a portion of the diffusely transmitted light from the diffuser and the second surface receives at least some light from the coupler that does not impinge on the diffuser. During operation, the luminaire provides light within a first output angular range and a second output angular range different from the first output angular range.

Implementations of the fourth aspect may include one or more of the following features. In some implementations, the diffuser is spaced apart from the one or more couplers. In some implementations, the diffuser extends in a first plane and the first and second surfaces of the reflector extend parallel to a common plane that is non-parallel to the plane in which the diffuser extends. In some implementations, the diffuser extends across a portion of the width of the light guide proximate the output end.

In some implementations of the third and fourth aspect, the reflector is a diffuse reflector. In some implementations of the third and fourth aspect, the one or more couplers substantially propagate light within a solid transparent material. In some implementations of the third and fourth aspect, the reflector has an elongate configuration. In some implementations of the third and fourth aspect, the at least one of the surfaces of the reflector is convex. In some implementations of the third and fourth aspect, the at least one of the surfaces of the reflector is concave.

Among other advantages, the disclosed luminaires may be configured to provide intensity profiles of light to reduce or avoid glare. For example, luminaires may be configured to direct little or no light into angular ranges that corresponds to glare (e.g., angles that are about 40° or less with respect to the ceiling normal).

Alternatively, or additionally, components of the disclosed luminaires can be configured to mix light emitted from multiple point-like sources, such that direct and/or indirect illumination output thereby have specifiable luminance and/or color uniformities.

These and/or other advantages may be provided by luminaires that are relatively inexpensive to manufacture. For example, the luminaires may be composed of relatively few components. Moreover, the individual components may be formed from conventional optical materials (e.g., optical plastics such as acrylic polymers or polycarbonate) and/or by conventional techniques.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE FIGURES

Like elements in different figures are identified with the same reference numeral.

DETAILED DESCRIPTION OF THE TECHNOLOGY

Figure 1:
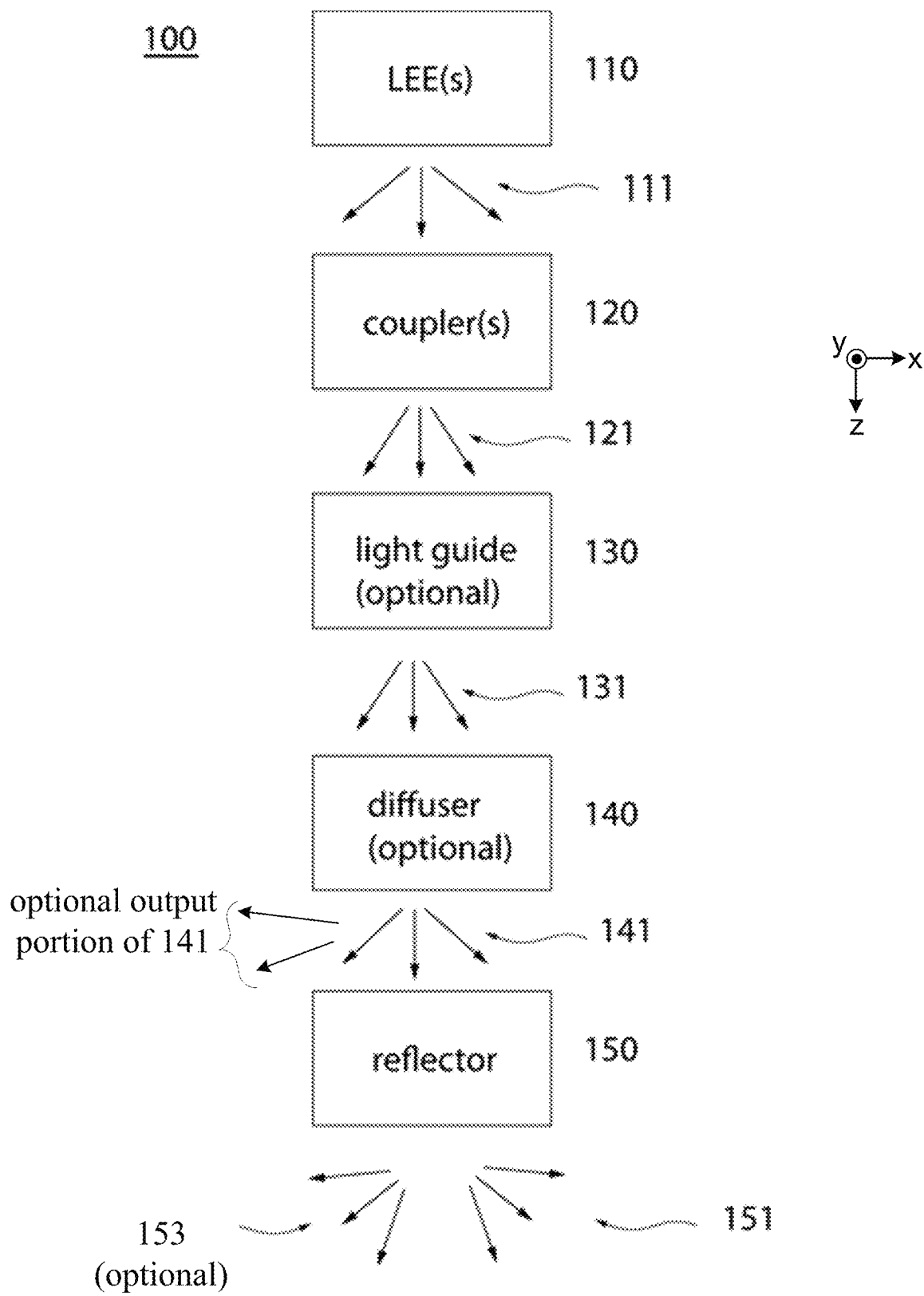
FIG. 1 illustrates a block diagram of a solid-state luminaire according to the present technology.

The present technology provides a solid-state luminaire 100. FIG. 1 illustrates a block diagram of the solid-state luminaire 100 according to embodiments of the present technology. The luminaire 100 includes one or more light emitting elements (LEEs) 110, one or more couplers 120, a reflector 150 and at least one of a light guide 130 and a diffuser 140.

During operation, the LEEs 110 provide light within a first angular range 111. Such light can be characterized by a Lambertian distribution relative to the optical axes of the one or more LEEs 110 (e.g., the z-axis of the Cartesian reference system shown in FIG. 1.) In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

The one or more couplers 120 are configured to receive the light from the LEEs 110 within the first angular range 111 and provide light within a second angular range 121. The one or more couplers 120 can be configured to transform the first angular range into the second angular range via total internal reflection, specular reflection or both. As such, the one or more couplers 120 can include a solid transparent material for propagating light from an input end to an output end of each of the one or more couplers 120. Typically the divergence of the second angular range is smaller than the divergence of the first angular range. As used herein, providing light in an "angular range" refers to providing light that propagates in a prevalent direction and has a divergence with respect to the propagation direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

In embodiments with the diffuser 140 but no light guide 130, light from the one or more couplers 120 is provided to the diffuser 140 from which light is then provided to the reflector 150. An example of this embodiment of the solid-state luminaire is described below in connection with FIGS. 2A-2B. In embodiments with the light guide 130 but no diffuser 140, light from the one or more couplers 120 is provided through the light guide 130 to the reflector 150. An example of this embodiment of the solid-state luminaire is described below in connection with FIG. 4. In some embodiments with the light guide 130 and the diffuser 140, light from the one or more couplers 120 is provided through the light guide 130 to the diffuser 140 and from the diffuser 140 to the reflector 150. An example of this embodiment of the solid-state luminaire is described below in connection with FIG. 3. In some other embodiments with the light guide 130 and the diffuser 140, light from the one or more couplers 120 is provided through the light guide 130 such that (i) some of the provided light impinges on the diffuser 140 and from the diffuser 140 to the ambient and (ii) some other of the provided light impinges on the reflector 150. Examples of such embodiments of the solid-state luminaire are described below in connection with FIGS. 5A and 6A.

The diffuser 140 can extend across all or a portion of an output end 133 of the light guide 130. The light guide 130 provides light in a third angular range 131. The third angular range 131 can be substantially equal to the second angular range 121. The diffuser 140 provides light in a fourth angular range 141. The fourth angular range 141 can be different from the third angular range 131 in overall direction and/or divergence (not illustrated). Depending on the embodiment, none, or one or more portions of the fourth angular range can be directed towards the ambient.

Figure 2A:
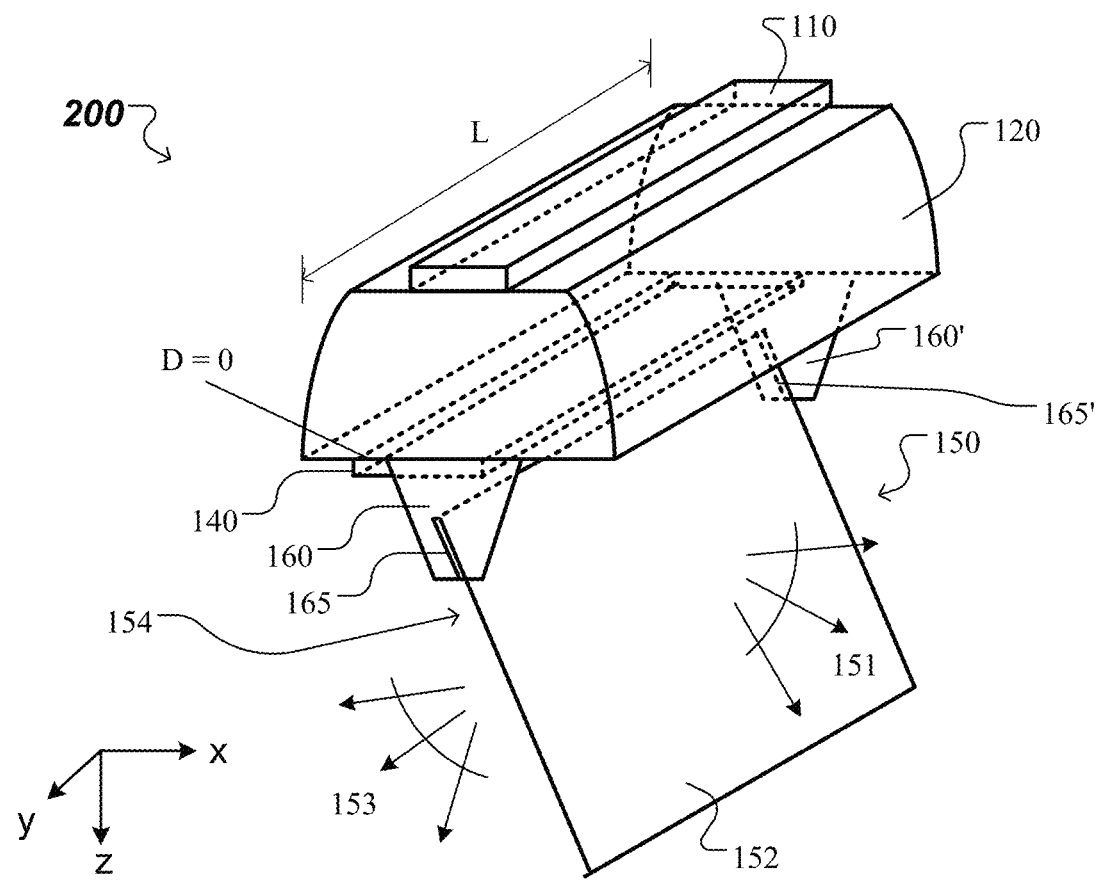
FIGS. 2A-2C illustrate aspects of a first example of a solid-state luminaire.
Figure 2B:
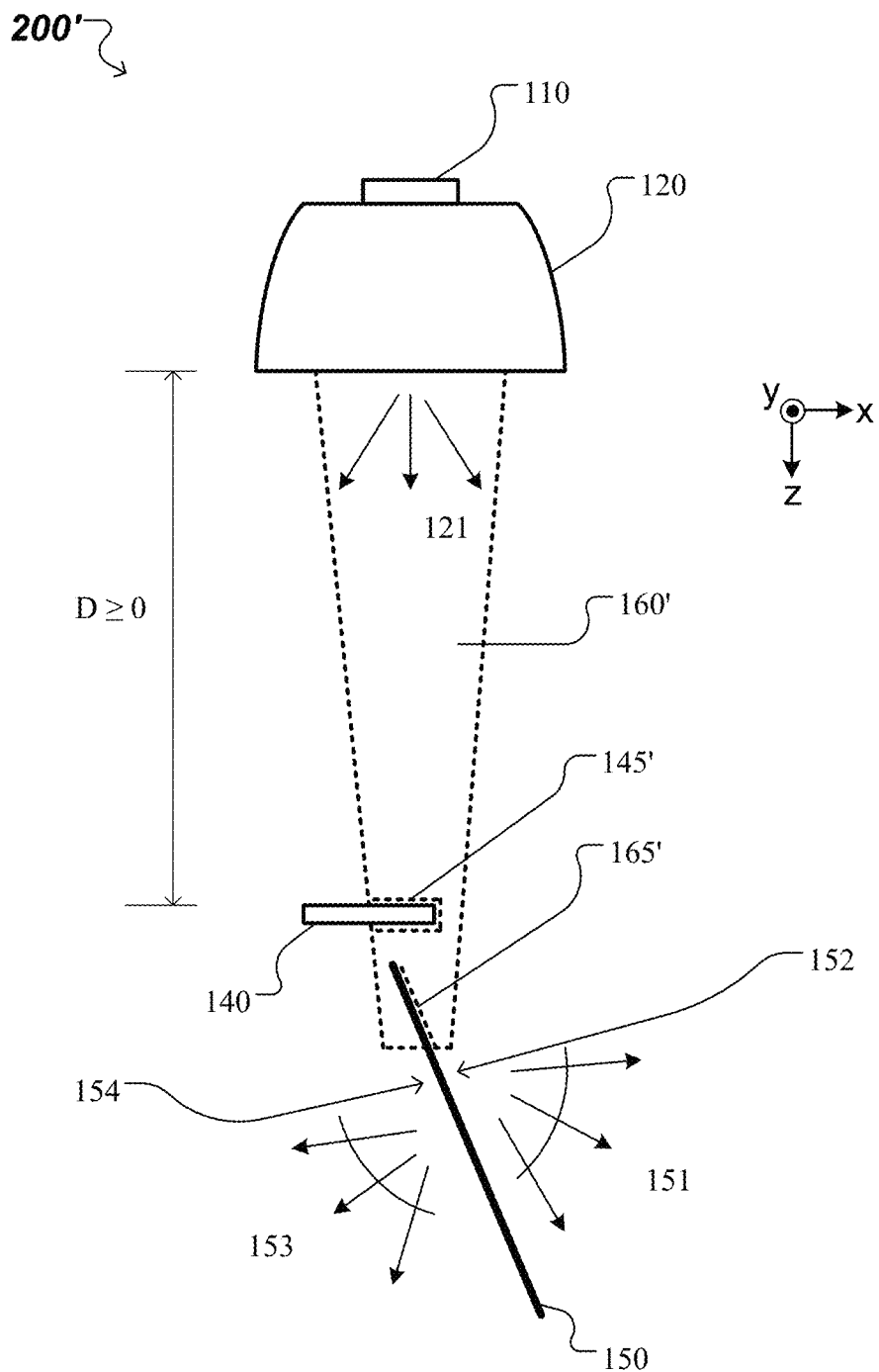
Figure 3:
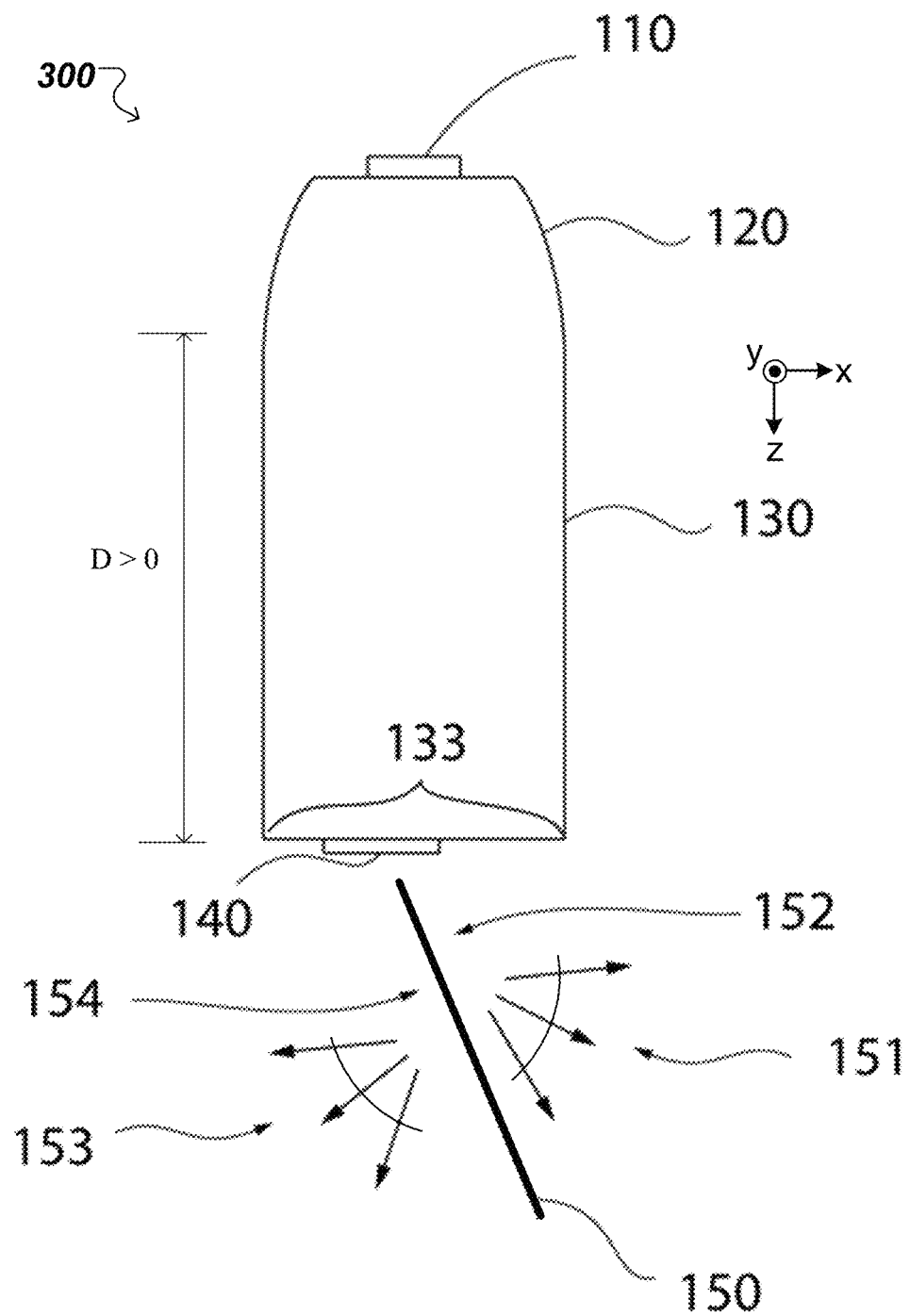
FIG. 3 illustrates a schematic sectional view of a second example of a solid-state luminaire.
Figure 4A:
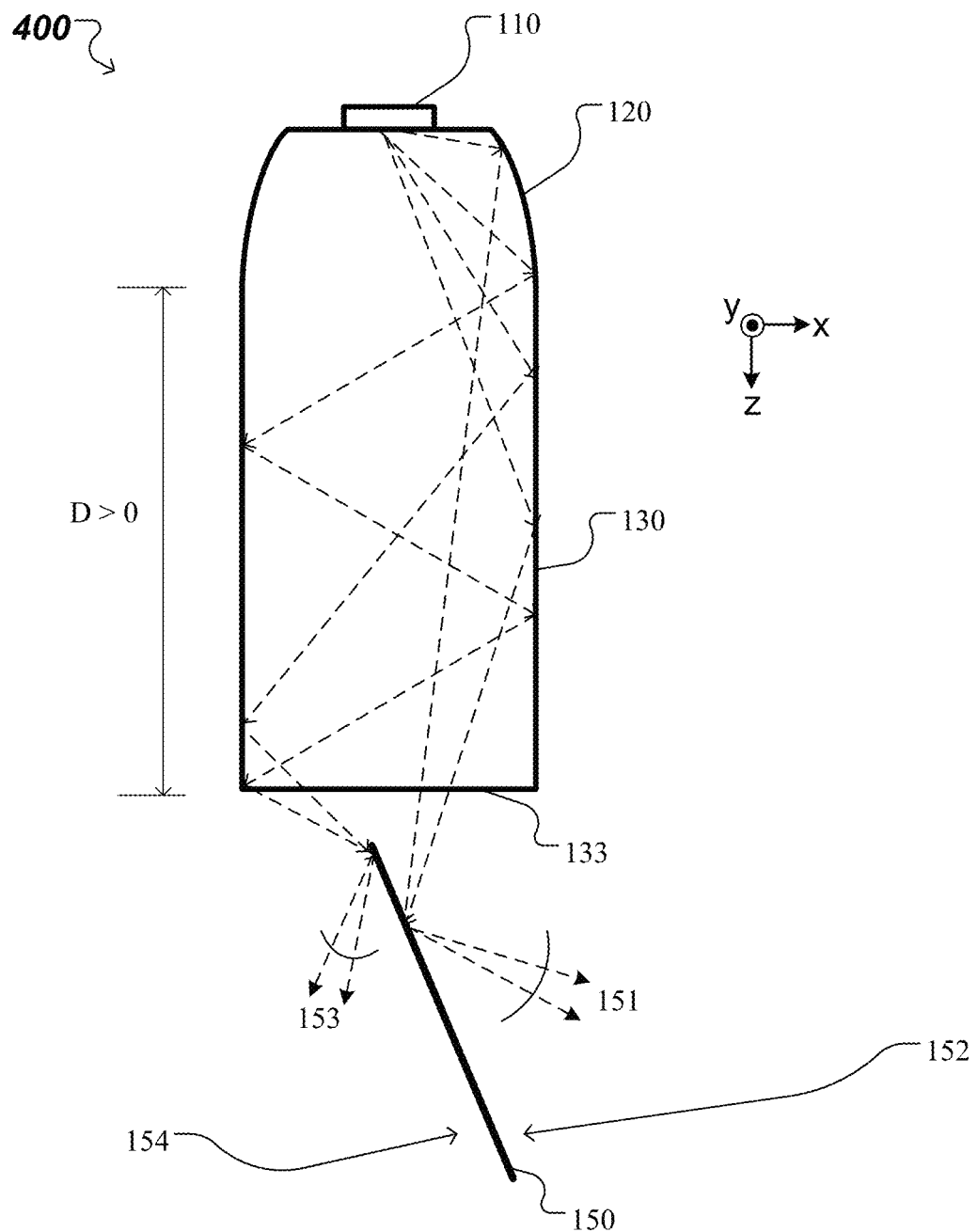
FIGS. 4A-4B illustrate aspects of a third example of a solid-state luminaire.

An example of the reflector 150 is schematically illustrated in a perspective view in FIG. 2A and in sectional views in FIGS. 2B, 3 and 4A. The reflector 150 has a first surface and a second surface. The reflector 150 can have a uniform or varying thickness (not illustrated) and the first and/or second surfaces can have a planar, convex, concave or other shape. In some implementations, at least one of the first and second surfaces is continuous, e.g., is smooth, without facets. In other implementations, at least one of the first and second surfaces is discontinuous, e.g., has two or more facets. Additionally, the first surface and the second surface can have the same or different specular and/or diffuse reflective properties.

Depending on the embodiment, at least one of the first and second surfaces of the reflector 150 is arranged to receive light from the one or more couplers 120 through at least one of the light guide 130 and the diffuser 140. In some implementations, the first surface and the second surface are arranged and configured to provide light in a first output angular range 151 and a second output angular range 153, respectively. Light within the first and second output angular ranges 151 and 153 can make up all or part of the light output by the luminaire 100. In other implementations, only the first surface is arranged to receive light from the one or more couplers 120 through the light guide 130 and is configured to provide light in the first angular range 151 only. In this case, the diffuser 140 is arranged and configured to provide diffuse light to the ambient in at least an output portion of the fourth angular range 141. Light within the output portion of the fourth angular range 141 and in the first output angular range 151 can make up all or part of the light output by the luminaire 100. In some other implementations, one or more portions of angular ranges 151 and/or 153 can be directed towards the light guide 130 and/or other components of the solid-state luminaire 100.

FIG. 2A shows a schematic perspective view of a solid-state luminaire 200. In this example, the luminaire 200 includes one or more light emitting elements (LEEs) 110, one or more couplers 120, a diffuser 140 and a reflector 150. In this case, the diffuser 140 and the reflector 150 are supported by frames 160, 160' which are mechanically coupled, at two ends of the luminaire 200, with the one or more couplers 120. A distance "D" between an output end of the one or more couplers 120 and the diffuser 140 can be finite or zero, D≥0. In the example illustrated in FIG. 2A, the diffuser 140 is directly coupled to and extends across all or a portion of the output end of the one or more couplers 120, such that D=0. If the couplers 120 provide a solid material exit aperture, the diffuser 140 can include a film attached to or a coating applied directly on at least a portion of the output end of the couplers 120 and/or a transparent carrier. The film or the coating can include a random or engineered microstructure that can diffuse light transmitted through the film or coating. Furthermore, the random or engineered microstructure can be imparted directly to the surface of the output end of the couplers 120 (without the use of a film or coating) by treating the surface via sandblasting, engraving, etc.

FIG. 2B shows a schematic x-z sectional view of the solid-state luminaire 200 (when D=0) or a different solid-state luminaire 200' (when D>0, e.g., D=10, 20, 50 cm). In the latter case, the diffuser 140 is spaced apart from and extends across the output end of the one or more couplers 120, such that D>0. Here, the diffuser 140 can be a substrate or a slab that has on a surface or in bulk at least a region having a random or engineered microstructure responsible for the diffusive transmission of substrate or slab.

In some implementations, luminaire 200' has a non-elongated configuration, e.g., the luminaire 200' can have rotational symmetry around the z-axis. Here, rotational symmetry refers to invariance under discrete or continuous rotation.

The reflector 150 is coupled with the frames 160, 160' at two reflector joints (see reflector joints 165, 165' with frames 160, 160' in FIG. 2A, and reflector joint 165' with frame 160' in FIG. 2B). The diffuser 140 is coupled with the frames 160, 160' at two diffuser joints (see one diffuser joint 145' with frame 160' in FIG. 2B). In some implementations, the reflector joints and/or the diffuser joints can be welding joints or solder joints so the reflector 150 and/or the diffuser 140 are permanently fixed to the frames 160, 160'. In other implementations, the reflector joints and/or the diffuser joints are slotted joints so the reflector 150 and/or the diffuser 140 can be removed from the frames 160, 160' for cleaning, resurfacing, etc.

The reflector 150 has a first surface 152 and a second surface 154. The reflector 150 can have a uniform or varying thickness (not illustrated) and the first and second surfaces can have a planar, convex, concave or other shape. The first surface 152 and the second surface 154 can have the same or different specular and/or diffuse reflective properties. In some implementations, at least one of the first 152 and second 154 surfaces is continuous, e.g., is smooth, without facets. In other implementations, at least one of the first 152 and second 154 surfaces is discontinuous, e.g., has two or more facets.

In the example illustrated in FIG. 2A, at least some of the components of the luminaire 200 are elongated along the y-axis of a Cartesian reference system. In this case, the luminaire 200 has a longitudinal dimension L. For example, L can be 1', 2' or 4'.

During operation of both luminaires 200, 200', the LEEs 110 provide light within a first angular range (labeled 111 in FIG. 1) relative to the z-axis. The one or more couplers 120 are configured to receive the light from the LEEs 110 within the first angular range and provide light within a second angular range (labeled 121 in FIGS. 1 and 2B). The one or more couplers 120 can be configured to transform the first angular range into the second angular range 121 via total internal reflection, specular reflection or both. As such, the one or more couplers 120 can include a solid transparent material for propagating light from an input end to an output end of each of the one or more couplers 120. Typically the divergence of the second angular range 121 is smaller than the divergence of the first angular range, at least in a plane perpendicular to the y-axis.

Light from the one or more couplers 120 is provided to the diffuser 140 from which diffuse light is then provided to the reflector 150. The diffuser 140 provides diffuse light in a fourth angular range (labeled 141 in FIG. 1). The fourth angular range can be different from the second angular range 121 in overall direction (not illustrated). In the examples illustrated in FIGS. 2A-2B, the first and second surfaces 152, 154 are arranged to receive diffuse light from the diffuser 140. The first surface 152 and the second surface 154 are configured to redirect the diffuse light received from the diffuser 140 and to provide redirected light in a respective first output angular range 151 and a second output angular range 153. Light within the first and second output angular ranges 151 and 153 can make up all or part of the light output by the luminaire 200 or 200'.

Figure 2C:
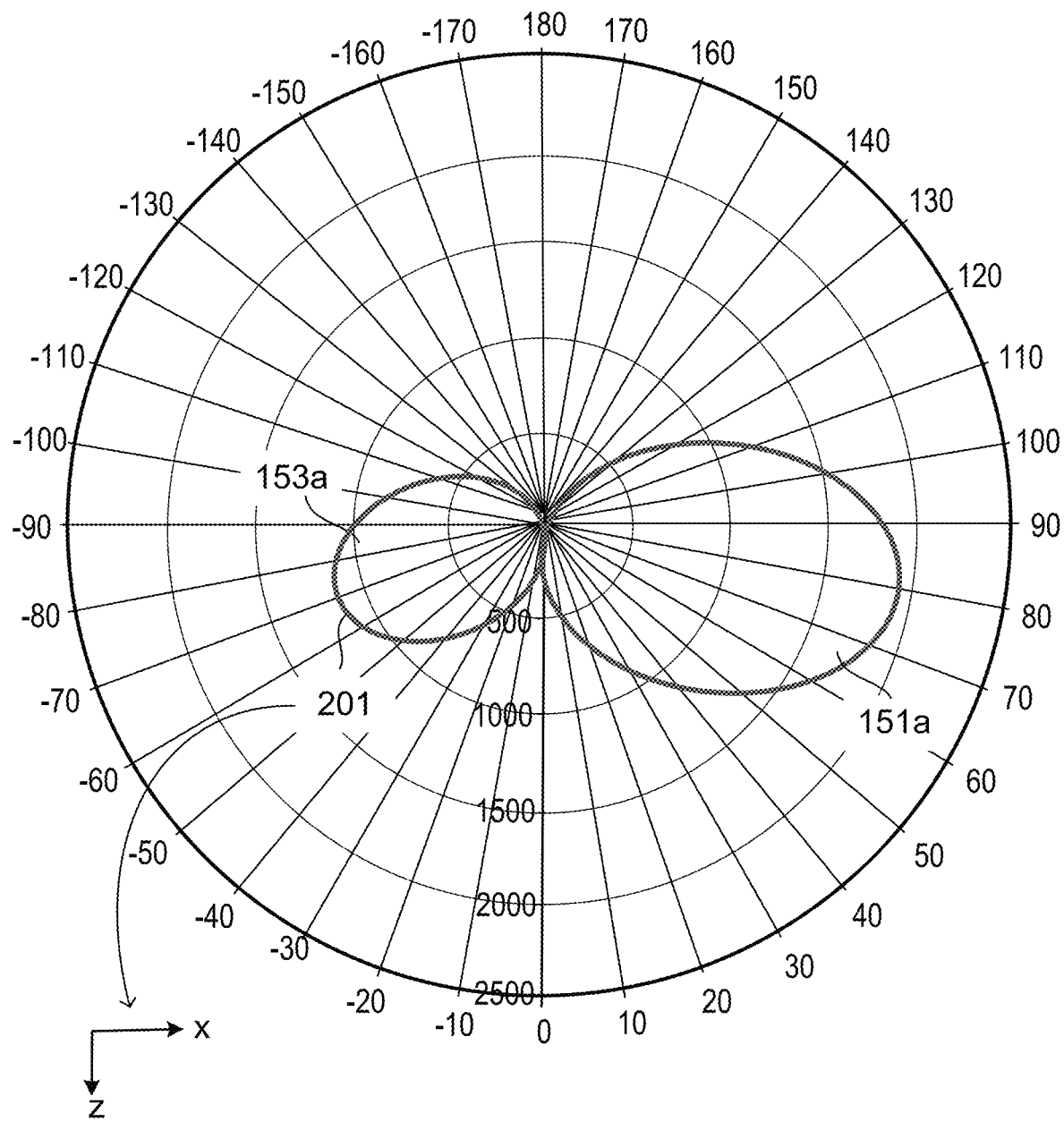

FIG. 2C shows a light intensity distribution 201 in the x-z cross-section of the luminaire 200 or 200'. Lobe 151a corresponds to diffuse light provided by the diffuser 140 that is redirected by the first surface 152 of the reflector 150 in the first output angular range 151. Lobe 153a corresponds to diffuse light provided by the diffuser 140 that is redirected by the second surface 154 of the reflector 150 in the second output angular range 153. A relative orientation of the lobes 151a, 153a (e.g., with respect to each other and/or to the z-axis) and their relative sizes (e.g., areas of the lobes) can depend on (i) an angular orientation of the reflector 150 relative to the diffuser 140, (ii) a relative separation between the reflector 150 and the diffuser 140 and (iii) a relative orientation between the first surface and the second surface. Depending on the embodiment, the relative orientation between the first and second surface can be other than parallel (as illustrated in FIGS. 2A and 2B, for example. The shapes of the lobes 151a, 153a (e.g., aspect ratios of the lobes) depend on respective shapes of the first 152 and second 154 surfaces.

The light intensity distribution 201 in an x-z cross-section described above in connection with FIG. 2C is generated by solid state luminaires that include a diffuser and a reflector. Solid state luminaires with a different structure can also generate the light intensity distribution 201.

FIG. 3 illustrates a schematic x-z sectional view of a solid-state luminaire 300. In this example, the luminaire 300 includes one or more light emitting elements (LEEs) 110, one or more couplers 120, a light guide 130, a diffuser 140 and a reflector 150. In some implementations, the luminaire 300 has an elongated configuration, e.g., with a longitudinal dimension along the y-axis, perpendicular to the page. In this case, L can be 1', 2' or 4', for instance. In other implementations, the luminaire 300 has a non-elongated configuration, e.g., the luminaire 300 can have rotational symmetry around the z-axis.

The light guide 130 has a finite length, D>0 along the z-axis, e.g., D=10, 20, 50 cm, from an input end to an output end 133. A thickness "t" of the light guide 130 along the x-axis can be much smaller than the length D along the z-axis, e.g., t≈5% D, 10% D or 20% D. In this case, the diffuser 140 is directly coupled to and extends across all or a portion of the output end 133 of the light guide 130. In some implementations, at least the reflector 150 can be supported by frames (labeled 160, 160' in FIGS. 2A, 2B) which are mechanically coupled with the one or more couplers 120 or with the light guide 130. The reflector 150 can be coupled with the frames at two reflector joints (labeled 165, 165' in FIG. 2A). In some implementations, the reflector joints can be welding joints or solder joints so the reflector 150 is permanently fixed to the frames. In other implementations, the reflector joints are slotted joints so the reflector 150 can be removed from the frames for cleaning, resurfacing, etc.

The reflector 150 has a first surface 152 and a second surface 154. The reflector 150 can have a uniform or varying thickness (not illustrated) and the first and second surfaces can have a planar, convex, concave or other shape. The first surface 152 and the second surface 154 can have the same or different specular and/or diffuse reflective properties. In some implementations, at least one of the first 152 and second 154 surfaces is continuous, e.g., is smooth, without facets. In other implementations, at least one of the first 152 and second 154 surfaces is discontinuous, e.g., has two or more facets.

During operation, the LEEs 110 provide light within a first angular range (labeled 111 in FIG. 1) relative to the z-axis.

The one or more couplers 120 are configured to receive the light from the LEEs 110 within the first angular range and provide light within a second angular range (labeled 121 in FIGS. 1 and 2B) to the light guide 130. The one or more couplers 120 can be configured to transform the first angular range into the second angular range via total internal reflection, specular reflection or both. As such, the one or more couplers 120 can include a solid transparent material for propagating light from an input end to an output end of each of the one or more couplers 120. Typically the divergence of the second angular range is smaller than the divergence of the first angular range.

Light received by the light guide 130 from the one or more couplers 120 is provided to the diffuser 140 in a third angular range (labeled 131 in FIG. 1.) In some implementations, the third angular range can be substantially equal to the second angular range. Light received by the diffuser 140 from the light guide is provided to the reflector 150. The diffuser 140 provides light in a fourth angular range (labeled 141 in FIG. 1). The fourth angular range can be different from the third angular range in overall direction and/or divergence (not illustrated). In the example illustrated in FIG. 3, the first and second surfaces 152, 154 are arranged to receive light from the diffuser 140. The first surface 152 and the second surface 154 are configured to provide light in a respective first output angular range 151 and a second output angular range 153. Light within the first and second output angular ranges 151 and 153 can make up all or part of the light output by the luminaire 300.

In this manner, the light intensity distribution 201 illustrated in FIG. 2C—described above to correspond to the x-z cross-section of the luminaires 200, 200'—also corresponds to the x-z cross-section of the luminaire 300. For example, Lobe 151a corresponds to diffuse light provided by the diffuser 140 that is redirected by the first surface 152 of the reflector 150 in the first output angular range 151. As another example, lobe 153a corresponds to diffuse light provided by the diffuser 140 that is redirected by the second surface 154 of the reflector 150 in the second output angular range 153. Here, a relative orientation of the lobes 151a, 153a (e.g., with respect to each other and/or to the z-axis) and their relative sizes (e.g., areas of the lobes) depend on (i) an angular orientation of the reflector 150 relative to the diffuser 140 and (ii) a relative separation between the reflector 150 and the diffuser 140. The shapes of the lobes 151a, 153a (e.g., aspect ratios of the lobes) depend on respective shapes of the first 152 and second 154 surfaces.

Hence, the light intensity distribution 201 in an x-z cross-section described above in connection with FIG. 2C is generated either by solid state luminaires 200, 200' that include a diffuser and a reflector or by luminaire 300 that includes a diffuser, a light guide and a reflector. Solid state luminaires with a different structure can generate light intensity distributions different from the light intensity distribution 201.

FIG. 4A illustrates a schematic x-z sectional view of a solid-state luminaire 400. In this example, the luminaire 400 includes one or more light emitting elements (LEEs) 110, one or more couplers 120, a light guide 130 and a reflector 150. In some implementations, the luminaire 400 has an elongated configuration, e.g., with a longitudinal dimension (or width) L along the y-axis, perpendicular to the page. In this case, L can be 1', 2' or 4', for instance. In other implementations, the luminaire 400 has a non-elongated configuration, e.g., the luminaire 400 can have rotational symmetry around the z-axis.

The light guide 130 has a finite length, $D>0$ along the z-axis, e.g., D=10, 20, 50 cm, from an input end to an output end 133. A thickness "t" of the light guide 130 along the x-axis can much smaller than the length D along the z-axis, e.g., $t \approx 5\%$ D, 10% D or 20% D. In some implementations, at least the reflector 150 can be supported by frames (labeled 160, 160' in FIGS. 2A, 2B) which are mechanically coupled with the one or more couplers 120 or with the light guide 130. The reflector 150 can be coupled with the frames at two reflector joints (labeled 165, 165' in FIG. 2A). In some implementations, the reflector joints can be welding joints or solder joints so the reflector 150 is permanently fixed to the frames. In other implementations, the reflector joints are slotted joints so the reflector 150 can be removed from the frames for cleaning, resurfacing, etc.

The reflector 150 has a first surface 152 and a second surface 154. The reflector 150 can have a uniform or varying thickness (not illustrated) and the first and second surfaces can have a planar, convex, concave or other shape. The first surface 152 and the second surface 154 can have the same or different specular and/or diffuse reflective properties. In some implementations, at least one of the first 152 and second 154 surfaces is continuous, e.g., is smooth, without facets. In other implementations, at least one of the first 152 and second 154 surfaces is discontinuous, e.g., has two or more facets.

During operation, the LEEs 110 provide light within a first angular range (labeled 111 in FIG. 1) relative to the z-axis. The one or more couplers 120 are configured to receive the light from the LEEs 110 within the first angular range and provide light within a second angular range (labeled 121 in FIGS. 1 and 2B) to the light guide 130. The one or more couplers 120 can be configured to transform the first angular range into the second angular range via total internal reflection, specular reflection or both. As such, the one or more couplers 120 can include a solid transparent material for propagating light from an input end to an output end of each of the one or more couplers 120. Typically the divergence of the second angular range is smaller than the divergence of the first angular range.

Light received by the light guide 130 from the one or more couplers 120 is guided to the output end 133 of the light guide 130 and provided to the reflector 150 in a third angular range (labeled 131 in FIG. 1.) In some implementations, the third angular range can be substantially equal to the second angular range. In the example illustrated in FIG. 4A, the first and second surfaces 152, 154 are arranged to receive light from the light guide 130. The first surface 152 and the second surface 154 are configured to provide light in a respective first output angular range 151 and a second output angular range 153. Light within the first and second output angular ranges 151 and 153 can make up all or part of the light output by the luminaire 400.

Figure 4B:
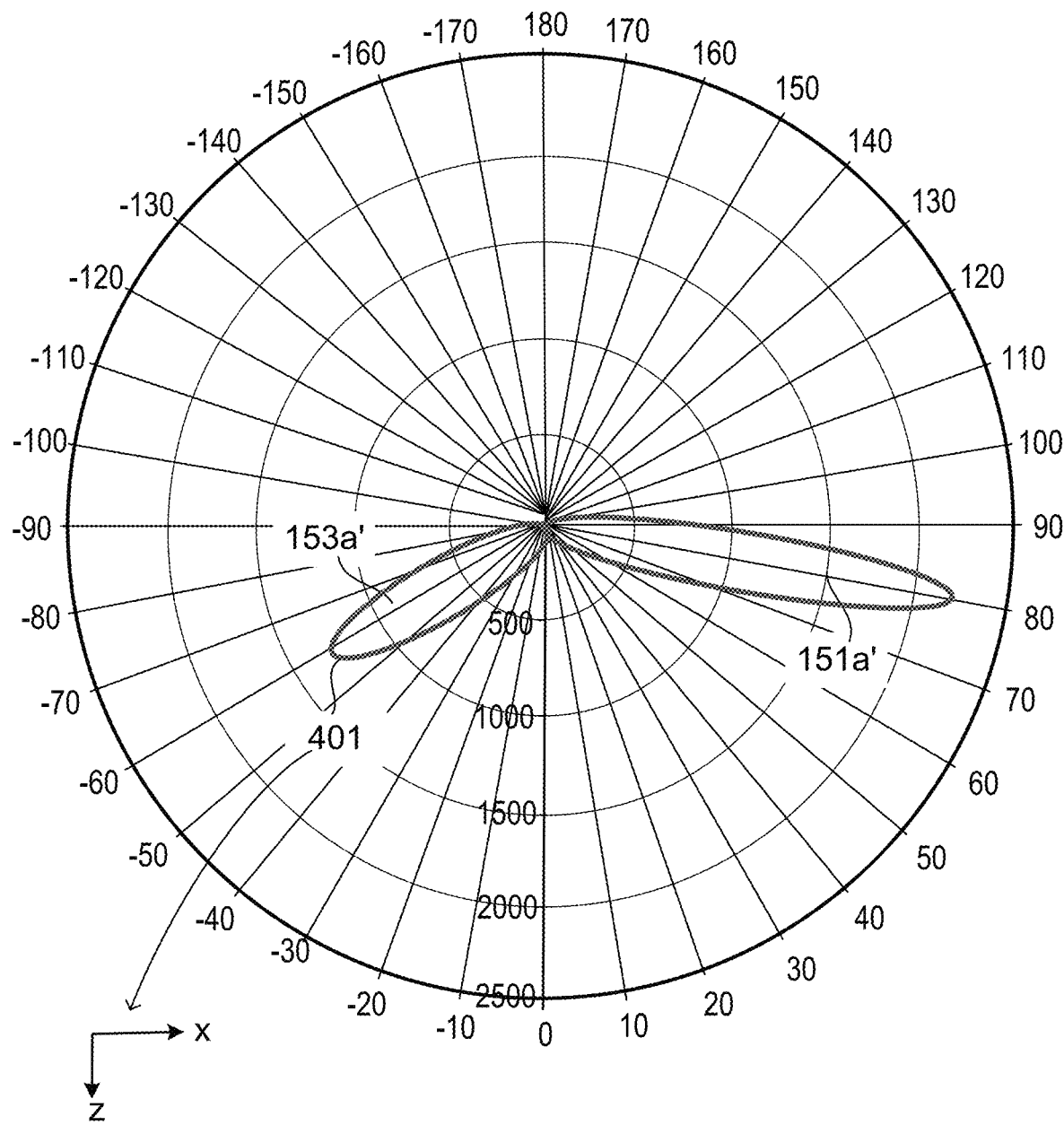

FIG. 4B shows a light intensity distribution 401 in the x-z cross-section of the luminaire 400. Lobe 151a' corresponds to light provided at the output end 133 of the light guide 130 that is redirected by the first surface 152 of the reflector 150 in the first output angular range 151. Lobe 153a' corresponds to light provided at the output end 133 of the light guide 130 that is redirected by the second surface 154 of the reflector 150 in the second output angular range 153. A relative orientation of the lobes 151a', 153a' (e.g., with respect to each other and/or to the z-axis) and their relative sizes (e.g., areas of the lobes) depend on (i) an angular orientation of the reflector 150 relative to the output end 133 of the light guide 130 and (ii) a relative separation between the reflector 150 and the output end 133 of the light guide 130. The shapes of the lobes 151a', 153a' (e.g., aspect ratios of the lobes) depend on respective shapes of the first 152 and second 154 surfaces.

Note that both lobes 151a, 153a of the light intensity distribution 201 and both lobes 151a', 153a' of the light intensity distribution 401 are oriented in the forward direction (predominantly in the +z direction.) Solid state luminaires with a different structure can generate light intensity distributions having at least one of two lobes oriented a backward direction (predominantly in the −z direction.)

Figure 5A:
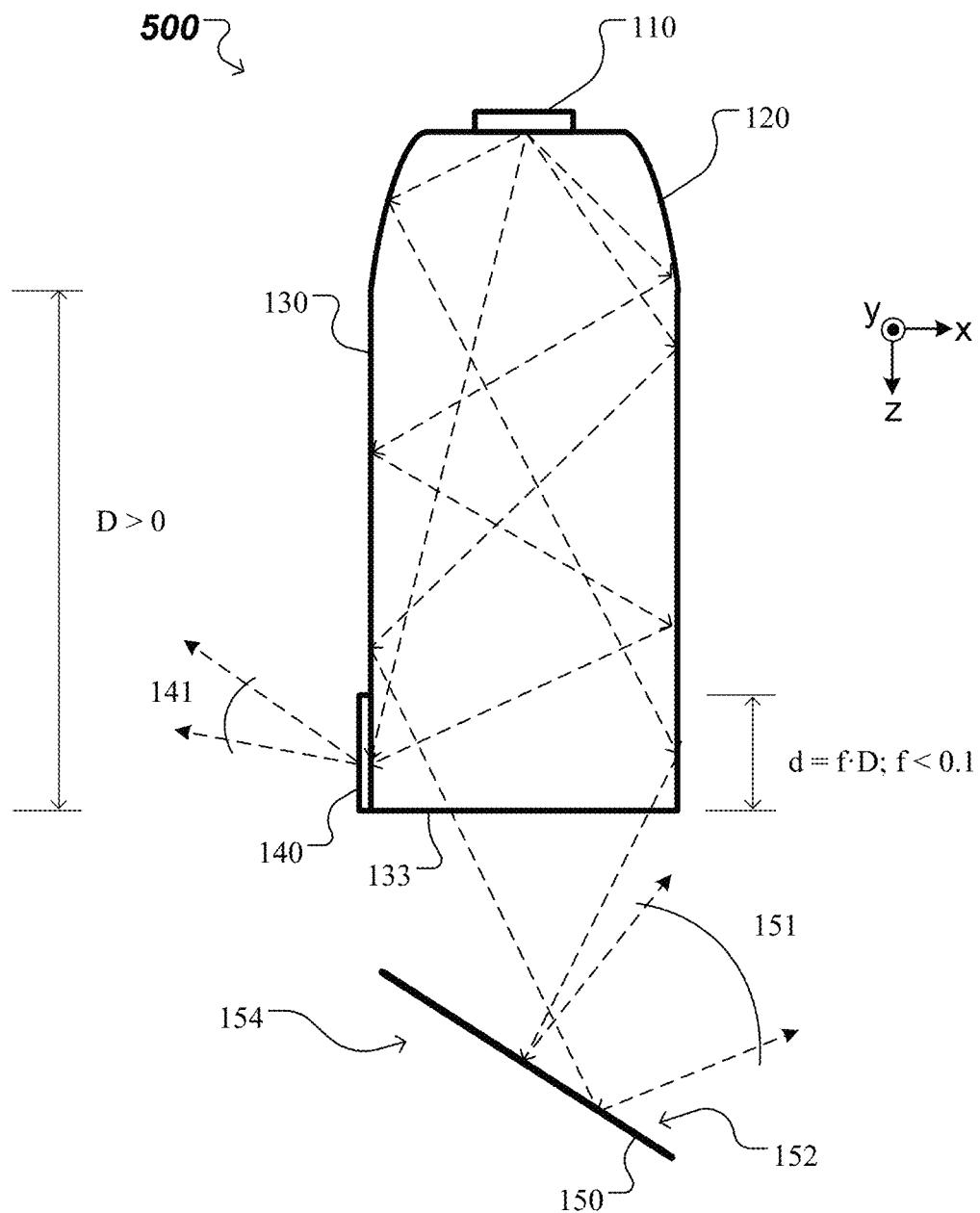
FIGS. 5A-5B illustrate aspects of a fourth example of a solid-state luminaire.

FIG. 5A illustrates a schematic x-z sectional view of a solid-state luminaire 500. In this example, the luminaire 500 includes one or more light emitting elements (LEEs) 110, one or more couplers 120, a light guide 130, a diffuser 140 and a reflector 150. In some implementations, the luminaire 500 has an elongated configuration, e.g., with a longitudinal dimension along the y-axis, perpendicular to the page. In this case, L can be 1', 2' or 4', for instance. In other implementations, the luminaire 500 has a non-elongated configuration, e.g., the luminaire 500 can have rotational symmetry around the z-axis.

The light guide 130 has a finite length, D>0 along the z-axis, e.g., D=10, 20, 50 cm, from an input end to an output end 133. A thickness "t" of the light guide 130 along the x-axis can be much smaller than the length D along the z-axis, e.g., t≈5% D, 10% D or 20% D. In this case, the diffuser 140 is directly coupled to a finite portion of single side of the light guide 130 adjacent to the output end 133 of the light guide 130. As such the length "d" along the z-axis of the diffuser 140 represents a fraction "f" of the length D of the light guide 130, d=fD. The fraction "f" can be 2%, 5% or 10%, for instance. Additionally, a width of the diffuser extends along the y-axis across the entire longitudinal direction L or a portion thereof. In some implementations, at least the reflector 150 can be supported by frames (similar to elements 160, 160' in FIGS. 2A, 2B) which are mechanically coupled with the one or more couplers 120 or with the light guide 130. The reflector 150 can be coupled with the frames at two reflector joints (labeled 165, 165' in FIG. 2A). In some implementations, the reflector joints can be welding joints or solder joints so the reflector 150 is permanently fixed to the frames. In other implementations, the reflector joints are slotted joints so the reflector 150 can be removed from the frames for cleaning, resurfacing, etc.

The reflector 150 has a first surface 152 and a second surface 154. The reflector 150 can have a uniform or varying (not illustrated) thickness and the first and second surfaces can have a planar, convex, concave or other shape. Here, the reflector 150 is spaced apart from the output end 133 of the light guide 130 and oriented such that all the light provided in the third angular range (labeled 131 in FIG. 1) at the output end 133 of the light guide 130 impinges only on the first surface 152 of the reflector 150. In this case, the first surface 152 is specular. In some implementations, the first surface 152 is continuous, e.g., is smooth, without facets. In other implementations, the first surface 152 is discontinuous, e.g., has two or more facets.

During operation, the LEEs 110 provide light within a first angular range (labeled 111 in FIG. 1) relative to the z-axis. The one or more couplers 120 are configured to receive the light from the LEEs 110 within the first angular range and provide light within a second angular range (labeled 121 in FIGS. 1 and 2B) to the light guide 130. The one or more couplers 120 can be configured to transform the first angular range into the second angular range via total internal reflection, specular reflection or both. As such, the one or more couplers 120 can include a solid transparent material for propagating light from an input end to an output end of each of the one or more couplers 120. Typically the divergence of the second angular range is smaller than the divergence of the first angular range.

Light received by the light guide 130 from the one or more couplers 120 is guided from its input end to the output end 133. A fraction of the light guided by the light guide 130 adjacent its output end 133 interacts with the diffuser 140 along the length "d" thereof. The guided light that interacts with the diffuser is provided by the diffuser 140 in a first output angular range 141. In some implementations, a prevalent propagation direction of the diffused light in the first output angular range 141 is orthogonal to the z-axis (e.g., parallel to the x-axis), corresponding to sideways illumination. In other implementations, depending on a microstructure of the diffuser 140, prevalent propagation direction of the diffused light in the first output angular range 141 can have a component parallel or anti-parallel to the z-axis, respectively corresponding to forward or backward illumination.

Light that is guided by the light guide 130 to its output end 133 without interacting with the diffuser 140, is provided to the reflector 150 in a third angular range (labeled 131 in FIG. 1.) In some implementations, the third angular range can be substantially equal to the second angular range. In the example illustrated in FIG. 5A, the reflector 150 positioned and oriented relative to the output end 133 of the light guide 130 to receive all the light provided in the third angular range only at the first surface 152 of the reflector 150. The first surface 152 is configured to provide light in a second output angular range 151. In this manner, light within the first output angular range 141 and second output angular range 151 can make up all or part of the light output by the luminaire 500.

Figure 5B:
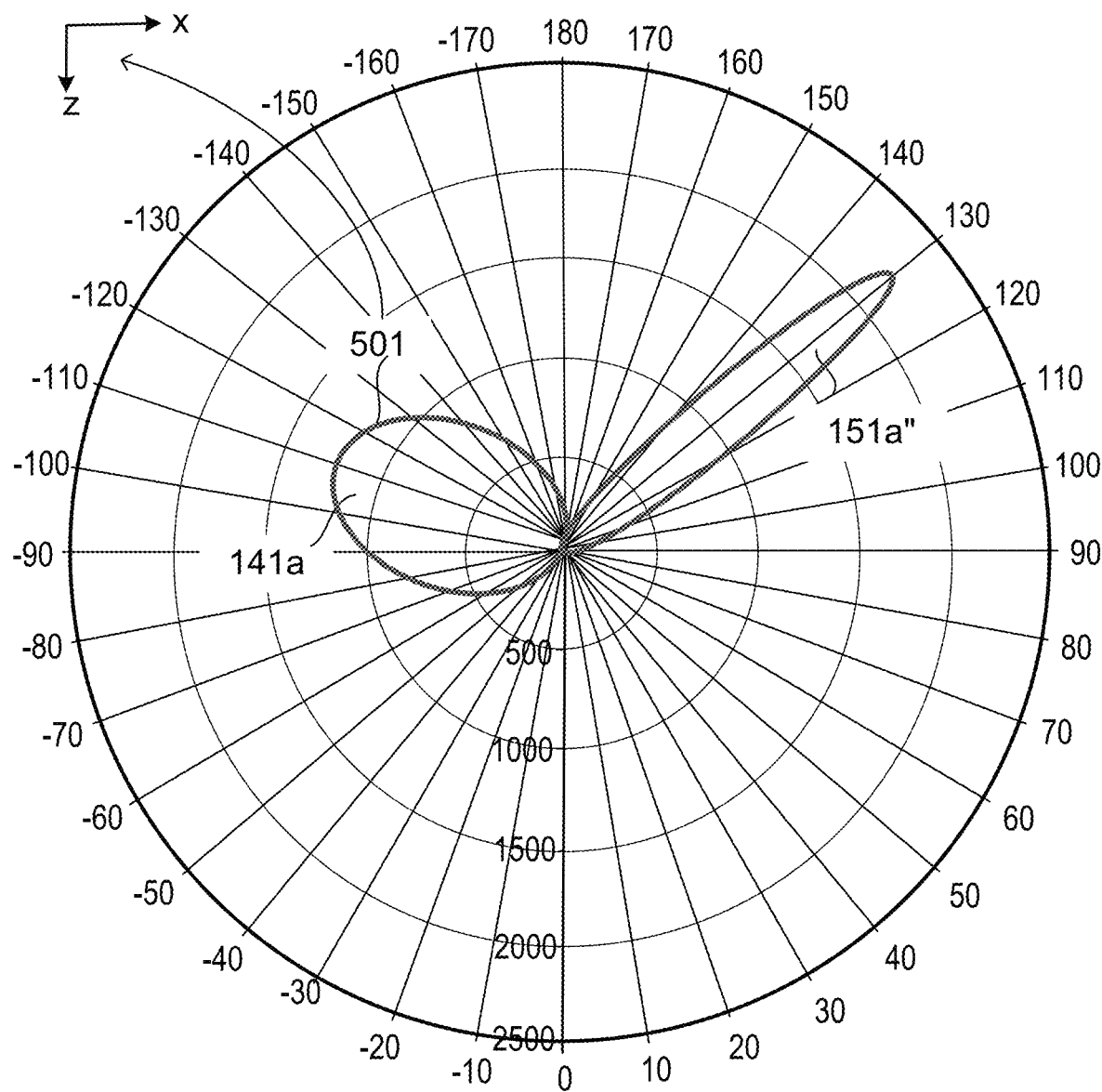

FIG. 5B shows a light intensity distribution 501 in the x-z cross-section of the luminaire 500. Lobe 141a corresponds to diffuse light provided in the first output angular range 151 by the diffuser 140—located adjacent the output end 133 on a single side surface of the light guide 130—from guided light that interacted with the diffuser 140. Lobe 151a" corresponds to light redirected by the first surface 152 of the reflector 150 in the second output angular range 151 from light that did not interact with the diffuser 140 and was provided at the output end 133 of the light guide 130.

An orientation of the lobe 141a (e.g., with respect to the z-axis) and a shape of thereof (e.g., aspect ratio of the lobe 141a) depend on microstructure of the diffuser 140. An orientation of the lobe 151a" (e.g., with respect to the z-axis) depends on (i) an angular orientation of the reflector 150 relative to the output end 133 of the light guide 130 and (ii) a relative separation between the reflector 150 and the output end 133 of the light guide 130. The shape of the lobe 151a" (e.g., aspect ratio of the lobe 151a") depends on shape of the first 152 surface. Relative sizes of the lobes 141a and 151a" (e.g., areas of the lobes) depend on the ratio f=d/D of the length of the diffuser 140 and light guide 130 along the z-axis.

Solid state luminaires with a different structure can generate light intensity distributions different from the light intensity distributions 201, 401 and 501 described above.

Figure 6A:
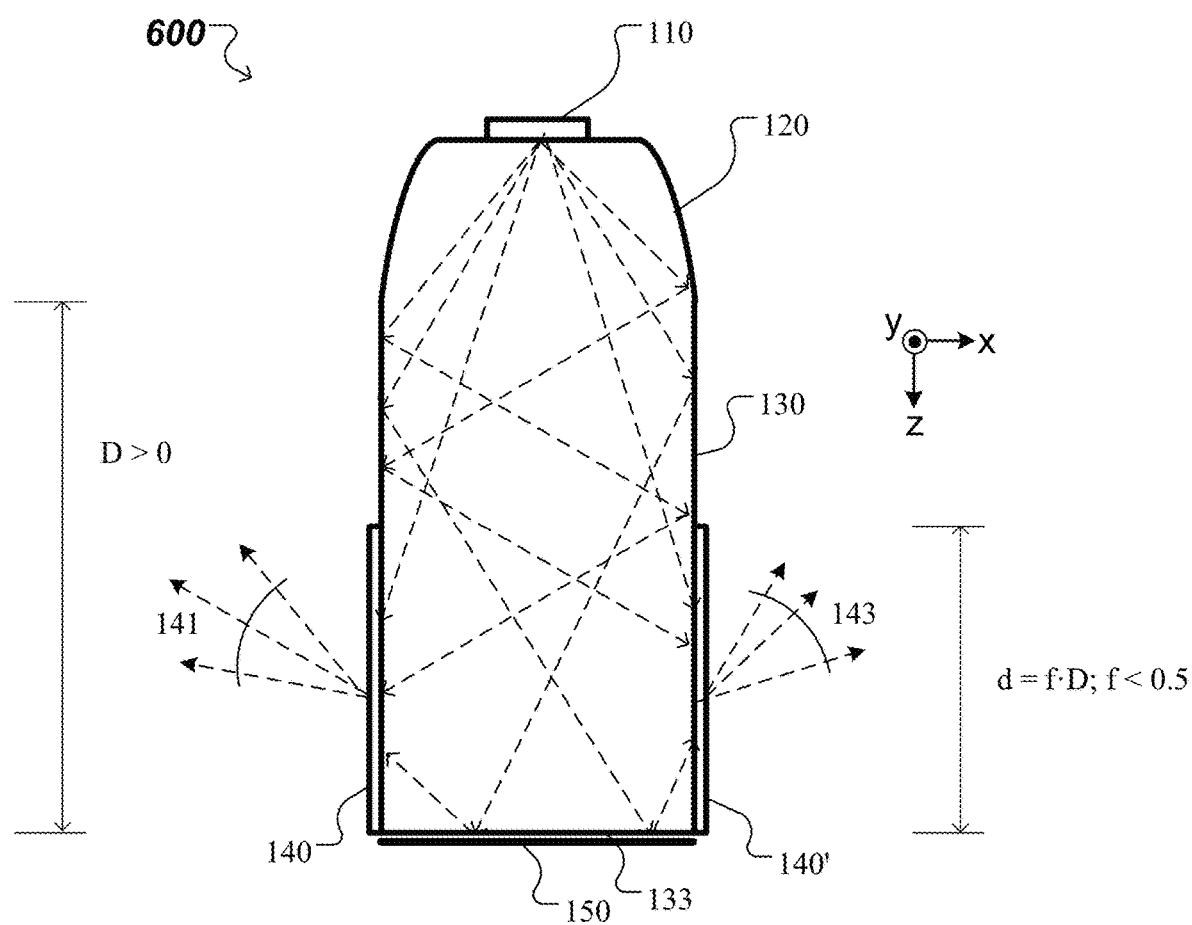
FIGS. 6A-6B illustrate aspects of a fifth example of a solid-state luminaire.

FIG. 6A illustrates a schematic x-z sectional view of a solid-state luminaire 600. In this example, the luminaire 600 includes one or more light emitting elements (LEEs) 110, one or more couplers 120, a light guide 130, first and second diffusers 140, 140' and a reflector 150. In some implementations, the luminaire 600 has an elongated configuration, e.g., with a longitudinal dimension along the y-axis, perpendicular to the page. In this case, L can be 1', 2' or 4', for instance. In other implementations, the luminaire 600 has a non-elongated elongated configuration, e.g., the luminaire 600 can have rotational symmetry around the z-axis.

The light guide 130 has a finite length, D>0 along the z-axis, e.g., D=10, 20, 50 cm, from an input end to an output end 133. A thickness "t" of the light guide 130 along the x-axis can be much smaller than the length D along the z-axis, e.g., t≈5% D, 10% D or 20% D.

In this case, the first diffuser 140 is directly coupled to a first finite portion of a first side of the light guide 130 adjacent to the output end 133 of the light guide 130. As such, a first length $d_1$ along the z-axis of the first diffuser 140 represents a first fraction $f_1$ of the length D of the light guide 130, $d_1=f_1D$. The second diffuser 140' is directly coupled to a second finite portion of a second side (e.g., opposing the first side) of the light guide 130 adjacent to the output end 133. As such, the length $d_2$ along the z-axis of the second diffuser 140' represents a second fraction $f_2$ of the length D of the light guide 130, $d_2=f_2D$. The first and second fractions $f_1$, $f_2$ can be 2%, 5%, 10%, 20% or 50%, for instance. In the example illustrated in FIG. 6A, the first and second fractions are the same $f_1=f_2=f$. Moreover, corresponding widths of the first and second diffusers 140, 140' extend along the y-axis across the entire longitudinal direction L or a portion thereof.

In some implementations, at least the reflector 150 can be supported by frames (labeled 160, 160' in FIGS. 2A, 2B) which are mechanically coupled with the one or more couplers 120 or with the light guide 130. The reflector 150 can be coupled with the frames at two reflector joints (labeled 165, 165' in FIG. 2A). In some implementations, the reflector joints can be welding joints or solder joints so the reflector 150 is permanently fixed to the frames. In other implementations, the reflector joints are slotted joints so the reflector 150 can be removed from the frames for cleaning, resurfacing, etc.

The reflector 150 has a first surface 152 and a second surface 154. The reflector 150 can have a uniform or varying thickness (not illustrated) and the first and second surfaces can have a planar, convex, concave or other shape. Here, the reflector 150 is directly coupled to at least a portion of the output end 133 of the light guide 130 such that all the light that impinges on the output end 133 reflects off the first surface 152 of the reflector 150. In this case, the first surface 152 is specular. In some implementations, the first surface 152 is continuous, e.g., is smooth, without facets. In other implementations, the first surface 152 is discontinuous, e.g., has two or more facets.

During operation, the LEEs 110 provide light within a first angular range (labeled 111 in FIG. 1) relative to the z-axis. The one or more couplers 120 are configured to receive the light from the LEEs 110 within the first angular range and provide light within a second angular range (labeled 121 in FIGS. 1 and 2B) to the light guide 130. The one or more couplers 120 can be configured to transform the first angular range into the second angular range via total internal reflection, specular reflection or both. As such, the one or more couplers 120 can include a solid transparent material for propagating light from an input end to an output end of each of the one or more couplers 120. Typically the divergence of the second angular range is smaller than the divergence of the first angular range.

Light received by the light guide 130 from the one or more couplers 120 is guided from its input end to the output end 133. A first fraction of the light guided by the light guide 130 adjacent its output end 133 interacts with the first diffuser 140 along the length $d_1$ thereof, and a second fraction of the light guided by the light guide 130 adjacent its output end 133 interacts with the second diffuser 140' along the length d2 thereof. Note that in the example illustrated in FIG. 6A, $d_1=d_2=d$. The guided light that interacts with the first diffuser 140 is provided by the first diffuser 140 in a first output angular range 141, and the guided light that interacts with the second diffuser 140' is provided by the second diffuser 140' in a second output angular range 143. In some implementations, prevalent propagation directions of the diffused light in the first and second output angular ranges 141, 143 are orthogonal to the z-axis (e.g., parallel/antiparallel to the x-axis), corresponding to sideways (left/right) illumination. In other implementations, depending on microstructures of the first and second diffusers 140, 140', a prevalent propagation direction of the diffused light in each of the first and second output angular ranges 141, 143 can have a component parallel or antiparallel to the z-axis, respectively corresponding to forward or backward illumination. For example, the first output angular range 141 can be oriented backward and the first output angular range 141 can be oriented backward. As another example, both the first and second output angular ranges 141, 143 can be oriented backward, as shown in FIG. 6A.

Light guided by the light guide 130 to its output end 133 without interacting with the first or second diffusers 140, 140' reflects off the first surface 152 of the reflector 150 and then either impinges on the first or second diffusers 140, 140', or propagates towards the input end of the light guide 130. In this manner, light within the first output angular range 141 and second output angular range 143 can make up all or part of the light output by the luminaire 600.

Figure 6B:
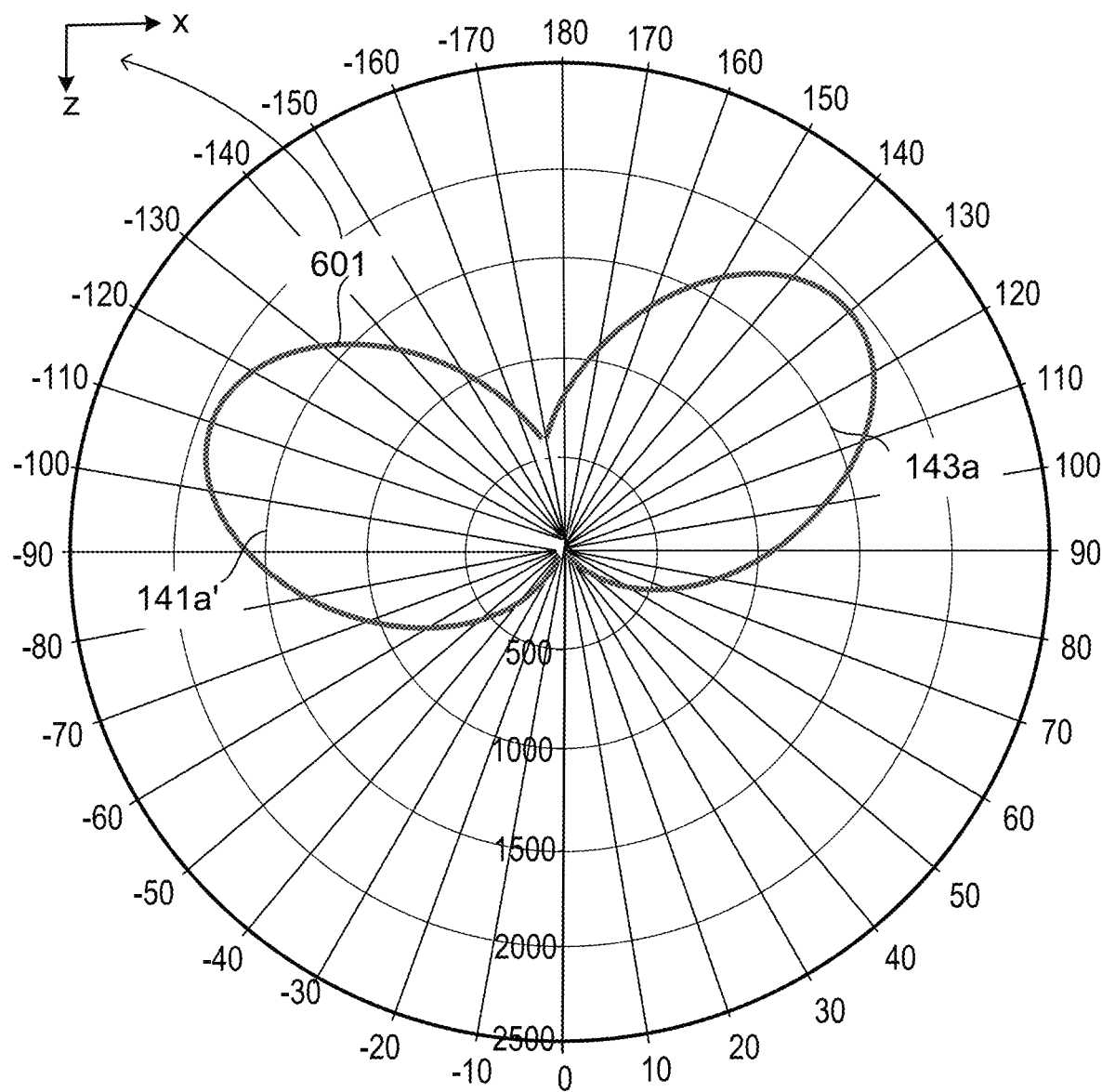

FIG. 6B shows a light intensity distribution 601 in the x-z cross-section of the luminaire 600. Lobe 141a' corresponds to diffuse light provided in the first output angular range 151 by the first diffuser 140—located adjacent the output end 133 on a side surface of the light guide 130—from guided light that interacted with the first diffuser 140. Lobe 143a corresponds to diffuse light provided in the second output angular range 143 by the second diffuser 140'—located adjacent the output end 133 on another (opposing) side surface of the light guide 130—from guided light that interacted with the second diffuser 140'.

An orientation of the lobe 141a' (e.g., with respect to the z-axis) and a shape of thereof (e.g., aspect ratio of the lobe 141a') depend on a first microstructure of the first diffuser 140. An orientation of the lobe 143a (e.g., with respect to the z-axis) and a shape of thereof (e.g., aspect ratio of the lobe 143a) depend on a second microstructure of the second diffuser 140'. Relative sizes of the lobes 141a' and 143a (e.g., areas of the lobes) depend on the ratios $f_{1,2}=d_{1,2}/D$ of the lengths of the first or second diffusers 140, 140' and light guide 130 along the z-axis. Note that for the example illustrated in FIG. 6A, $f_1=f_2=f$.

Embodiments of solid state luminaire 100 described above in connection with FIGS. 2A-2B, 3, 4A, 5A and 6A generate light intensity distributions 201, 401, 501 and 601 with two lobes. Solid state luminaires with a different structure can generate light intensity distributions with more than two lobes.

Figure 7A:
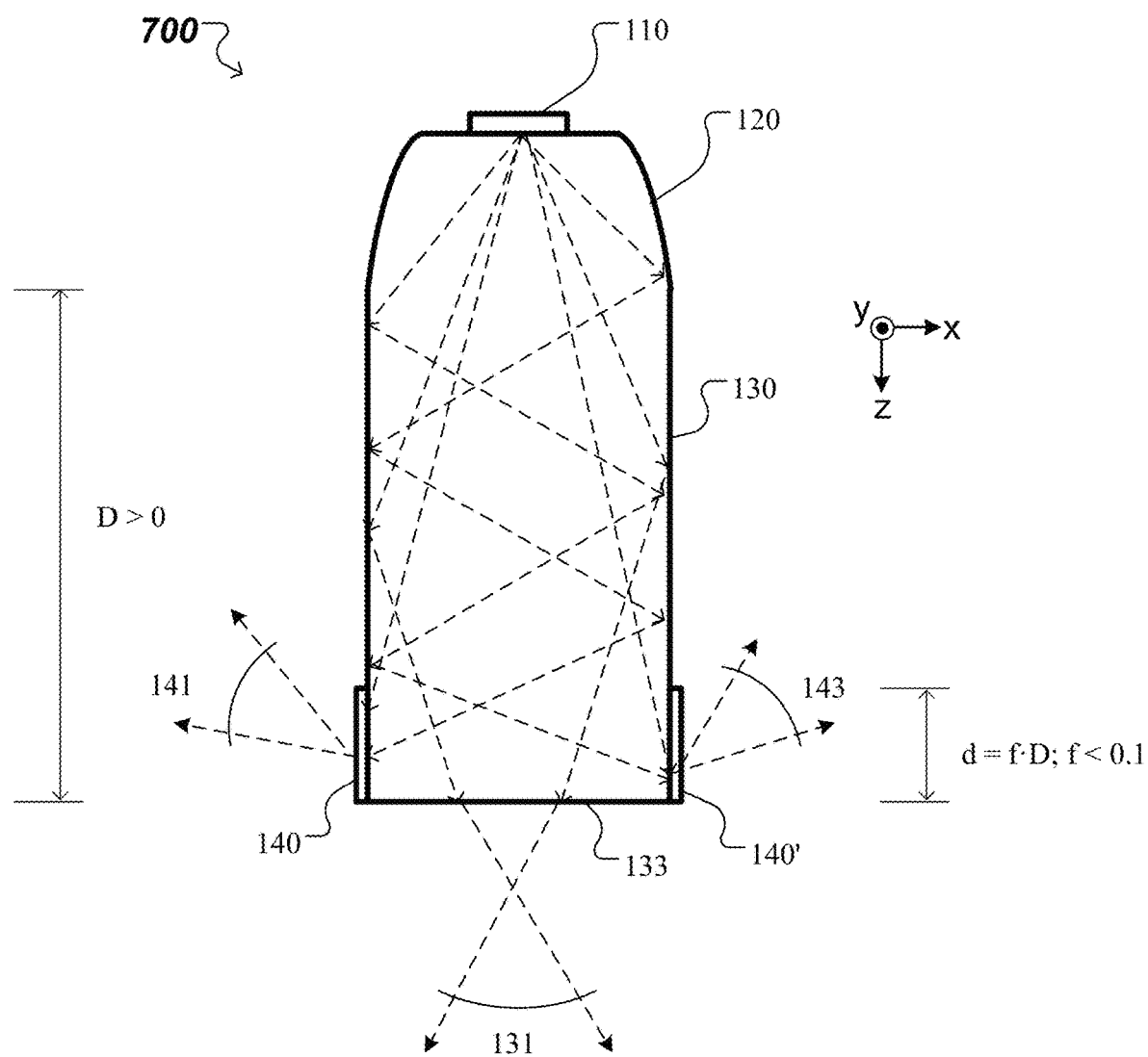
FIGS. 7A-7B illustrate aspects of a sixth example of a solid-state luminaire.

FIG. 7A illustrates a schematic x-z sectional view of a solid-state luminaire 700. In this example, the luminaire 700 includes one or more light emitting elements (LEEs) 110, one or more couplers 120, a light guide 130 and first and second diffusers 140, 140'. In some implementations, the luminaire 700 has an elongated configuration, e.g., with a longitudinal dimension L along the y-axis, perpendicular to the page. In this case, L can be 1', 2' or 4', for instance. In other implementations, the luminaire 700 has a non-elongated configuration, e.g., the luminaire 700 can have rotational symmetry around the z-axis.

The light guide 130 has a finite length, D>0 along the z-axis, e.g., D=10, 20, 50 cm, from an input end to an output end 133. A thickness "t" of the light guide 130 along the x-axis can be much smaller than the length D along the z-axis, e.g., t≈5% D, 10% D or 20% D.

In this case, the first diffuser 140 is directly coupled to a first finite portion of a first side of the light guide 130 adjacent to the output end 133 of the light guide 130. As such, a first length $d_1$ along the z-axis of the first diffuser 140 represents a first fraction $f_1$ of the length D of the light guide 130, $d_1=f_1D$. The second diffuser 140' is directly coupled to a second finite portion of a second side (e.g., opposing the first side) of the light guide 130 adjacent to the output end 133. As such, the length d2 along the z-axis of the second diffuser 140' represents a second fraction $f_2$ of the length D of the light guide 130, $d_2=f_2D$. The first and second fractions $f_1$, $f_2$ can be 2%, 5% or 10%, for instance. In the example illustrated in FIG. 6A, the first and second fractions are the same $f_1=f_2=f$. Moreover, corresponding widths of the first and second diffusers 140, 140' extend along the y-axis across the entire longitudinal direction L or a portion thereof.

In some implementations, frames (labeled 160, 160' in FIGS. 2A, 2B) are mechanically coupled with the one or more couplers 120 or with the light guide 130, at two ends of the luminaire 700 along the y-axis.

During operation, the LEEs 110 provide light within a first angular range (labeled 111 in FIG. 1) relative to the z-axis. The one or more couplers 120 are configured to receive the light from the LEEs 110 within the first angular range and provide light within a second angular range (labeled 121 in FIGS. 1 and 2B) to the light guide 130. The one or more couplers 120 can be configured to transform the first angular range into the second angular range via total internal reflection, specular reflection or both. As such, the one or more couplers 120 can include a solid transparent material for propagating light from an input end to an output end of each of the one or more couplers 120. Typically the divergence of the second angular range is smaller than the divergence of the first angular range.

Light received by the light guide 130 from the one or more couplers 120 is guided from its input end to the output end 133. A first fraction of the light guided by the light guide 130 adjacent its output end 133 interacts with the first diffuser 140 along the length $d_1$ thereof, and a second fraction of the light guided by the light guide 130 adjacent its output end 133 interacts with the second diffuser 140' along the length $d_2$ thereof. Note that in the example illustrated in FIG. 7A, $d_1=d_2=d$. The guided light that interacts with the first diffuser 140 is provided by the first diffuser 140 in a first output angular range 141, and the guided light that interacts with the second diffuser 140' is provided by the second diffuser 140' in a second output angular range 143. In some implementations, prevalent propagation directions of the diffused light in the first and second output angular ranges 141, 143 are orthogonal to the z-axis (e.g., parallel/antiparallel to the x-axis), corresponding to sideways (left/right) illumination. In other implementations, depending on microstructures of the first and second diffusers 140, 140', a prevalent propagation direction of the diffused light in each of the first and second output angular ranges 141, 143 can have a component parallel or anti-parallel to the z-axis, respectively corresponding to forward or backward illumination. For example, the first output angular range 141 can be oriented backward and the first output angular range 141 can be oriented backward. As another example, both the first and second output angular ranges 141, 143 can be oriented backward, as shown in FIG. 7A.

Light guided by the light guide 130 to its output end 133 without interacting with the first or second diffusers 140, 140' is output outside the luminaire 700 in a third output angular range 131. In some implementations, the third output angular range 131 can be substantially equal to the second angular range. In this manner, light within the first output angular range 141, second output angular range 143 and third output angular range 131 can make up all or part of the light output by the luminaire 700.

Figure 7B:
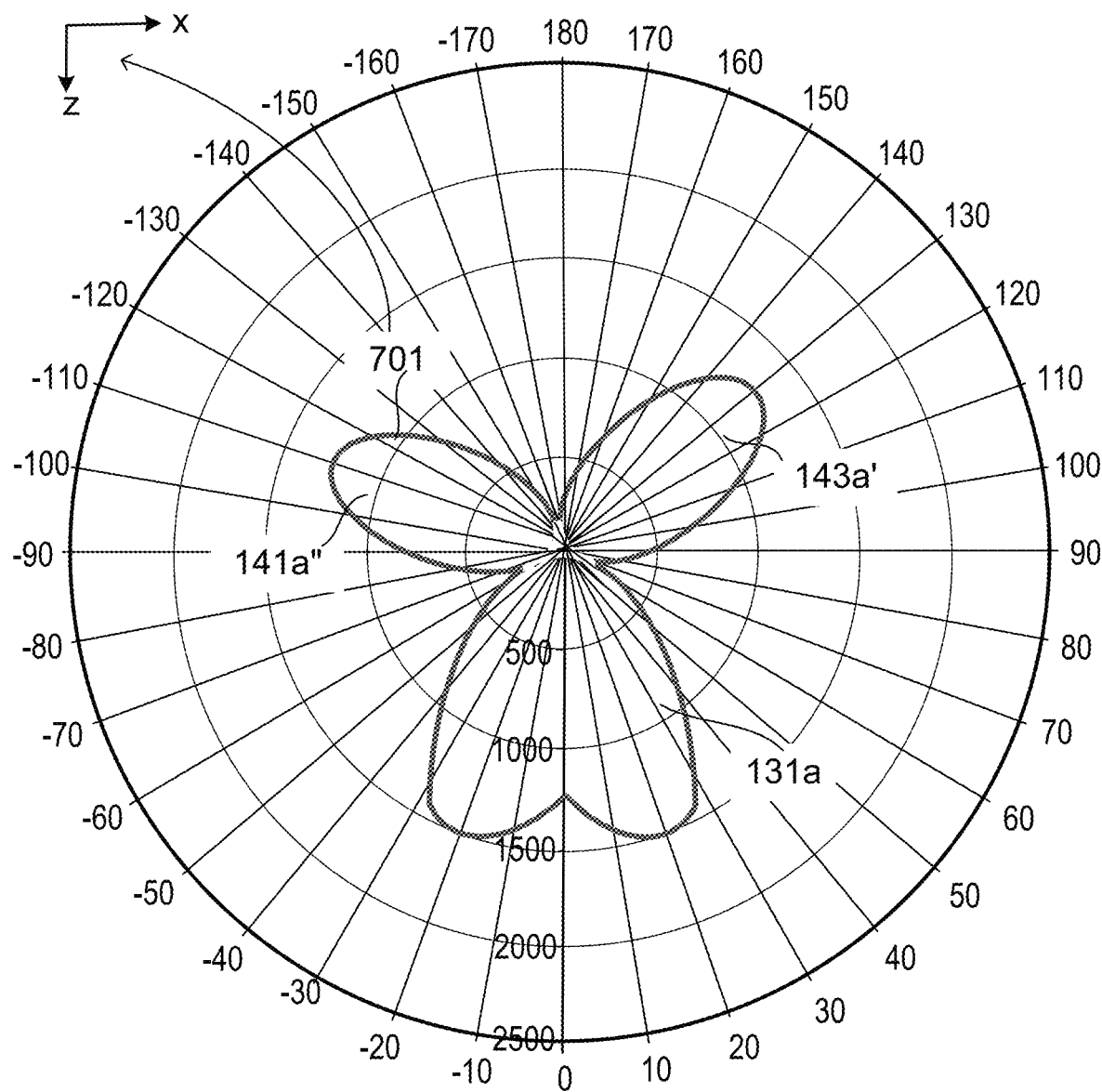

FIG. 7B shows a light intensity distribution 701 in the x-z cross-section of the luminaire 700. Lobe 141a" corresponds to diffuse light provided in the first output angular range 151 by the first diffuser 140—located adjacent the output end 133 on a side surface of the light guide 130—from guided light that interacted with the first diffuser 140. Lobe 143a' corresponds to diffuse light provided in the second output angular range 143 by the second diffuser 140'—located adjacent the output end 133 on another (opposing) side surface of the light guide 130—from guided light that interacted with the second diffuser 140'. Lobe 131a corresponds to light provided at the output end 133 of the light guide 130 from light that did not interact with the first or second diffusers 140, 140'.

An orientation of the lobe 141a" (e.g., with respect to the z-axis) and a shape of thereof (e.g., aspect ratio of the lobe 141a") depend on a first microstructure of the first diffuser 140. An orientation of the lobe 143a' (e.g., with respect to the z-axis) and a shape of thereof (e.g., aspect ratio of the lobe 143a') depend on a second microstructure of the second diffuser 140'. An orientation of the lobe 131a (e.g., with respect to the z-axis) and a shape of thereof (e.g., batwing) depend on (i) collimating characteristics of the one or more couplers 120, and guiding characteristics of the light guide 130. Relative sizes of the lobes 141a", 143a' and 131a (e.g., areas of the lobes) depend on the ratios $f_{1,2}=d_{1,2}/D$ of the lengths of the first or second diffusers 140, 140' and light guide 130 along the z-axis. Note that for the example illustrated in FIG. 7A, $f_1=f_2=f$.

In general, illumination devices (luminaires 100, 200, 200', 300, 400, 500, 600 and 700) described in this specification are configured to use light flux originating from a primary source (LEEs 110) of known dimensional, geometric, brightness and uniformity characteristics, and additional reflector/refractor/combination optics to output a specified radiation pattern. The additional optics redistribute the source flux's "phase-space" to a new phase-space of prescribed dimensional extent and angular divergence (e.g., directional cosines) while maintaining a substantially uniform intensity from the additional optics. These illumination devices can provide uniform illumination of the work surface, efficient energy conversion from the light source of the devices to the work surface, and uniform and/or glare-free intensity from the fixture itself when viewed from the work surface. Additionally, these devices can provide glare-free intensity characteristics while maintaining efficiency and directionality in flux redirection.

Depending on the embodiment, two or more of the one or more optical couplers 120, light guide 130, diffuser(s) 140 and/or reflector 150 of any of the luminaires 100, 200, 200', 300, 400, 500, 600 and 700 described above can be modularly configured. Modularly configured components of the disclosed luminaires 100, 200, 200', 300, 400, 500, 600 and 700 include or are configured for operative interconnection with suitably formed interconnection elements configured to facilitate registration, assembly and/or disassembly during manufacture, field servicing, or resurfacing, for example. Integral formation of two or more optical components of the disclosed luminaires, for example the optical couplers 120 and the light guide 130 or the light guide 130 and the diffuser(s) 140, can be employed to maintain Fresnel losses that may otherwise occur at optical interfaces at or below predetermined levels. Integral formation can facilitate registration and alignment of respective components of a luminaire.

Components of the disclosed luminaires 100, 200, 200', 300, 400, 500, 600 and 700 are formed from commodity plastics and/or sheet metals. As such, the foregoing components undergo extrusion and/or bending processes.

For instance, the LEEs 110 can be placed on a carrier made from extruded aluminum, such that the carrier not only supports the LEEs 110 but also has extended cooling surfaces to provide heat dissipation during operation.

In some implementations, the optical couplers 120 and the light guide 130 are fabricated from transparent plastics and have a full cross-section. Such optical components are referred to as solid optics. In other implementations, the optical couplers 120 and the light guide 130 are fabricated from or have coatings of reflective materials such as Al, Ag, and have hollow cross-section. The latter optical components are referred to as hollow optics.

In some implementations, the diffuser(s) 140 is(are) fabricated from diffuse transmitting material such as $TiO_2$-filled plastic or glass matrices having a random microstructure or an engineered microstructure. The diffuser(s) 140 made from such composite materials is(are) attached (as a film, coating, slab, etc.) to the optical coupler(s) 120 or the light guide 130 or supported remotely thereof by the frames 160, 160'. In other implementations, the diffuser(s) 140 is(are) implemented by treating (e.g., sandblasting, scratching, engraving, etc.) a particular region of the surface (or bulk) of the optical couplers 120 or light guide 130 to cause the particular region to diffusely transmit light that impinges onto with the particular region.

The reflector 150 is fabricated through from reflectively coated sheet metal. For example, a coating for the reflector 150 can be formed from non-diffuse reflective material such as Alanod Miro Ag.

The frames 160, 160' which support at least some of the optical couplers 120, the light guide 130 and the reflector 150 can be formed of extruded aluminum.

Unless defined otherwise, all technical and scientific terms used herein have the same meaning as commonly understood by one of ordinary skill in the art to which this technology belongs.

The invention claimed is:

1. A luminaire comprising:
one or more light-emitting elements (LEEs) arranged to provide light within a first angular range;
one or more couplers arranged to receive light from the one or more LEEs and configured to provide light within a second angular range;
a light guide comprising an input end and an output end at opposing ends of the light guide and a pair of opposing surfaces both extending along an axis of the light guide, the light guide being arranged to receive light from the one or more couplers at the input end and guide light along the axis to the output end of the light guide and output light from the output end in a first output angular range;
a first diffuser at a first of the opposing surfaces of the light guide adjacent the output end and configured to diffusely transmit light in a second output angular range; and
a second diffuser at a second of the opposing surfaces of the light guide adjacent the output end and opposite the first diffuser with respect to the axis of the light guide, wherein the second diffuser is configured to diffusely transmit light in a third output angular range, wherein the second output angular range is different from the third output angular range.

2. The luminaire according to claim 1, wherein the light in the first output angular range propagates forward and the light in at least one of the second or third output angular ranges propagates backward.

3. The luminaire according to claim 1, wherein the one or more couplers substantially propagate light within a solid transparent material.

4. The luminaire according to claim 1, wherein the light guide substantially propagates light within a solid transparent material.

5. The luminaire according to claim 1, wherein at least one of the first or second diffuser extends across a portion of the width of the light guide proximate the output end.

6. The luminaire according to claim 1, wherein the first diffuser is configured to predominantly diffusely transmit light in a first direction, wherein the first direction is offset from the axis of the light guide by a first angle,
wherein the second diffuser is configured to predominantly diffusely transmit light in a second direction, wherein the second direction is offset from the axis of the light guide by a second angle, and
wherein the first angle is different from the second angle.

7. The luminaire according to claim 1, wherein the first diffuser has a first length with respect to the axis of the light guide,
wherein the second diffuser has a second length with respect to the axis of the light guide, and
wherein the first length is different from the second length.

8. The luminaire according to claim 1, wherein a dimension of the first diffuser is different from a dimension of the second diffuser.

9. The luminaire according to claim 1, wherein the light guide is comprises transparent plastic, and
wherein at least one of the first diffuser or the second diffuser comprises a diffuse transmitting material.

10. The luminaire according to claim 9, wherein the diffuse transmitting material comprises a matrix including $TiO_2$.

11. The luminaire according to claim 10, wherein the matrix is a plastic matrix.

12. The luminaire according to claim 10, wherein the matrix is a glass matrix.

13. The luminaire according to claim 10, wherein the matrix comprises a random microstructure.

14. The luminaire according to claim 10, wherein the matrix comprises an engineered microstructure.

15. The luminaire according to claim 9, wherein at least one of the first diffuser or the second diffuser has a slab shape.

16. The luminaire according to claim 9, wherein at least one of the first diffuser or the second diffuser comprises a film or coating attached to the light guide.

* * * * *